UNITED STATES PATENT OFFICE 1,990,685

PROCESS FOR FRACTIONATING VINYL RESINS AND THE PRODUCT OBTAINED THEREBY

Charles O. Young and Stuart D. Douglas, Charleston, W. Va., assignors to Carbide & Carbon Chemicals Corporation, a corporation of New York No Drawing. Application March 28, 1931,
Serial No. 526,122

5 Claims. (Cl. 260—2)

The invention is a process for separating the polymerization products of vinyl compounds, hereinafter referred to as vinyl resins, into fractions, whereby improved resinous products are obtained.

Vinyl compounds, such as vinyl chloride or vinyl acetate, can be polymerized to produce resinous products which are of technical importance. Mixtures of vinyl compounds, for example, mixtures of vinyl chloride and vinyl acetate, may be polymerized while in mutual contact to form a resinous product which is different from both vinyl chloride and vinyl acetate polymers and from mixtures of these two polymers.

We have found that such a resin is in fact composed of a number of polymeric substances of different characteristics, but all apparently containing the same proportion of vinyl compounds that was present in the original monomeric mixture.

Resins which are produced by the conjoint polymerization of vinyl chloride and vinyl acetate, and especially those which contain more than about 50% of vinyl chloride, may be separated into fractions by the action of various solvents, whereby any desired fraction may be isolated. For example, a resin prepared by polymerizing a mixture containing 80% vinyl chloride and 20% vinyl acetate under certain conditions will largely dissolve in toluene. The solution which is obtained is not clear, and upon standing, an insoluble fraction settles out as a gel. This insoluble fraction possesses a higher average molecular weight, and a higher fusion point and is more resistant to heat and exposure than the soluble fraction. The two fractions may be separated by decantation, filtration, or centrifuging.

It is probable that the effect of the fractionation is to produce fractions of the resin which are distinguished by the difference between the average molecular weights of the fractions. Thus, polymers below a given molecular weight, say about 2000, are toluene-soluble, while those of higher molecular weights are insoluble in toluene. We have found that by means of this method of fractionation it is possible to produce insoluble resin fractions which do not vary substantially in their properties from batch to batch, even though the original resinous masses from which they were obtained vary considerably from each other due to non-uniformity of polymerizing conditions. While the toluene-soluble fractions vary more than the insoluble fractions under the same circumstances, such variation does not seriously impair their usefulness for the purposes for which this type of vinyl resin is best adapted. The separate fractions, in each instance, will possess properties which will distinguish them from the unfractionated resin and from other resins. Among their distinguishing properties may be listed melting points, solubilities, toughness, mechanical strength, resistance to heat and exposure and the viscosities of their solutions.

The individual resin portions are valuable for various purposes. The toluene-soluble fraction can be used to form resin solutions of very high resin content and low viscosity. This property makes this fraction very advantageous in the preparation of lacquers, adhesives, impregnating agents and the like.

The toluene-insoluble fraction is valuable as a molding plastic because of its greater infusibility, resistance to heat, and toughness. This resin may be dissolved in certain mixed solvents, such as a mixture of ethyl acetate and ethylene dichloride, or of toluene and ethylene glycol monoethyl ether, to form lacquers of comparatively high viscosity and low resin content. Films prepared from this resin fraction are hard and tough and resistant to heat, acids, alkalies and brine. However, the most important application of the insoluble fraction is the preparation of molding plastics.

The following examples are illustrative of the invention.

I. A resin was prepared by the polymerization of a mixture of 80 parts vinyl chloride and 20 parts vinyl acetate in the presence of 1 part benzoyl peroxide and 100 parts of toluene. This was carried out by heating the mixture for 24 hours at about 40° C. to 60° C. in an autoclave. The product obtained by the polymerization process described was a thick, opaque, viscous solution of the resin. Two hundred pounds of a 35% solution of this resin in toluene was thoroughly mixed with 500 pounds of toluene. When this solution was diluted to a resin content of about 10% the fractionating effect of toluene became apparent, and separation occurred. A large quantity of toluene insoluble gel settled out leaving a clear solution of resin above it. The latter was decanted off, centrifuged and concentrated at 60° C. in vacuo to a clear syrup. The insoluble gel may then be broken by adding the gel to a quantity of pentane or alcohol in which the resin is insoluble. The toluene in the gel is removed by the pentane or alcohol and the resin settles out as a powder which may be separated from the liquid and dried.

The portion comprising the soluble fraction was found to possess an average molecular weight of approximately 1500. In the dry form it melted at about 60° C. to 80° C.

The toluene-insoluble fraction was found to have an average molecular weight of 2500 or more and it did not melt below 125° C. This portion displayed but a limited solubility in solvents, such as chlorbenzol.

II. A resin was prepared by the polymerization of 80 parts of vinyl chloride and 20 parts of vinyl acetate in the presence of 1 part of benzoyl peroxide and 100 parts of acetone, all by weight. This was carried out by heating the mixture for 48 hours at 40° C. in an autoclave. The resin solution obtained was added to about 500 parts of water which dissolved the acetone and precipitated the resin. The latter was completely dried in vacuo. To 8 parts of the dry powdered resin were added 100 parts of a mixture of 70 parts benzol and 30 parts ethylene dichloride. The mixture was agitated for one hour. At the end of this time 72% of the resin was dissolved and 28% of the resin remained as an insoluble residue.

The resin fraction which was insoluble in this solvent mixture was higher melting, more resistant to heat and possessed a higher average molecular weight than the soluble fraction, but its properties were different from those of the toluene-insoluble fraction described in Example I.

Fractionation of the crude resin may be accomplished by the action of other solvents; for example, acetone, ethylene dichloride, benzol, chlorbenzol, or various combinations of these solvents may be used. Each fractionating medium produces a somewhat different set of fractions, but in each case the fraction which is insoluble in the solvent or solvent mixture used has a higher melting point, and molecular weight and greater resistance to heat than the soluble portion.

It will be apparent that the temperature of the solvent at the time of the separation will affect the nature of the fractions obtained. Thus, the portion of a crude resinous mass which is insoluble in boiling toluene will be higher melting and have a higher average molecular weight than the fraction obtained by a separation with cold toluene. If it is desired, the fractionation may be repeated to obtain a still finer degree of separation.

The advantages of our invention are shown by the fact that molded articles made from the crude resin are not as stable, tough or resistant to heat and do not possess as great a degree of mechanical strength as those made from the fraction of the crude resin which is insoluble in toluene as produced by our process. Also, the soluble portion produced by our process possesses advantages over the crude resin. Films prepared from solutions of the crude resin are usually clouded, while those made from solutions of the soluble fraction of the resin are perfectly clear and may be desirable for many purposes.

It is obvious that the process of our invention can be applied to resins produced under controlled conditions adapted to give a large proportion of either the high or lower molecular weight polymers, as well as for fractionating resins produced by the usual and well known methods of polymerization.

The process is especially adapted for fractionating conjointly polymerized vinyl resins derived from vinyl chloride and vinyl acetate and containing more than 50% vinyl chloride, but is understood that it is not restricted thereto, but that it is applicable to other conjointly polymerized vinyl compounds, particularly those which are formed from vinyl halides and vinyl esters of aliphatic acids.

We claim:

1. A process for preparing a polymeric vinyl resin fraction having a substantially uniform and relatively high fusion point, which comprises polymerizing a mixture of vinyl chloride and vinyl acetate by means of heat and a polymerizing catalyst and separating said resin fraction from the polymerized mass by the action of a solvent in which said fraction is insoluble, said solvent essentially comprising one of the group consisting of toluene, acetone, ethylene dichloride, benzol, chlorbenzol and mixtures thereof.

2. A process for preparing a polymeric vinyl resin fraction having a substantially uniform and relatively high fusion point, which comprises polymerizing a mixture of vinyl chloride and vinyl acetate by means of heat and a polymerizing catalyst and separating said resin fraction from the polymerized mass by the action of toluene in which said fraction is insoluble.

3. A process for preparing a polymeric vinyl resin fraction having a substantially uniform and relatively high fusion point, which comprises polymerizing a mixture of vinyl chloride and vinyl acetate by means of heat and a polymerizing catalyst and separating said resin fraction from the polymerized mass by the action of a solvent essentially comprising acetone.

4. A polymeric vinyl resin fraction having a substantially uniform and relatively high fusion point and a relatively low degree of solubility and which is substantially free from resin fractions having dissimilar properties, the composition of said resin fraction being identical with that of a resinous mass prepared by polymerizing a mixture of vinyl chloride and vinyl acetate, said resin fraction being characterized by substantial insolubility in cold toluene.

5. A polymeric vinyl resin fraction having a substantially uniform and relatively high fusion point and a relatively low degree of solubility and which is substantially free from resin fractions having dissimilar properties, the composition of said resin fraction being identical with that of a resinous mass prepared by polymerizing a mixture comprising about 80% of vinyl chloride and about 20% of vinyl acetate, said resin fraction being characterized by substantial insolubility in toluene.

CHARLES O. YOUNG.
STUART D. DOUGLAS.